United States Patent
Lim et al.

(10) Patent No.: US 11,664,037 B2
(45) Date of Patent: May 30, 2023

(54) METHODS OF ENCODING AND DECODING SPEECH SIGNAL USING NEURAL NETWORK MODEL RECOGNIZING SOUND SOURCES, AND ENCODING AND DECODING APPARATUSES FOR PERFORMING THE SAME

(71) Applicants: Electronics and Telecommunications Research Institute, Daejeon (KR); The Trustees of Indiana University, Indianapolis, IN (US)

(72) Inventors: Woo-taek Lim, Daejeon (KR); Seung Kwon Beack, Daejeon (KR); Jongmo Sung, Daejeon (KR); Mi Suk Lee, Daejeon (KR); Tae Jin Lee, Daejeon (KR); Inseon Jang, Daejeon (KR); Minje Kim, Indianapolis, IN (US); Haici Yang, Indianapolis, IN (US)

(73) Assignees: Electronics and Telecommunications Research Institute, Daejeon (KR); The Trustees of Indiana University, Indianapolis, IN (US)

( * ) Notice: Subject to any disclaimer, the term of this patent is extended or adjusted under 35 U.S.C. 154(b) by 0 days.

(21) Appl. No.: 17/326,035

(22) Filed: May 20, 2021

(65) Prior Publication Data
US 2021/0366497 A1 Nov. 25, 2021

Related U.S. Application Data

(60) Provisional application No. 63/029,086, filed on May 22, 2020.

(30) Foreign Application Priority Data

Apr. 26, 2021 (KR) .......................... 10-2021-0053581

(51) Int. Cl.
G10L 19/032 (2013.01)
G10L 21/0272 (2013.01)

(52) U.S. Cl.
CPC ........ *G10L 19/032* (2013.01); *G10L 21/0272* (2013.01)

(58) Field of Classification Search
CPC ......................... G10L 21/0272; G10L 19/032
See application file for complete search history.

(56) References Cited

U.S. PATENT DOCUMENTS 6,098,039 A * 8/2000 Nishida ............... G10L 19/0208
704/229
7,899,667 B2 3/2011 Byun et al.
(Continued)

FOREIGN PATENT DOCUMENTS

JP H11242499 A 9/1999

OTHER PUBLICATIONS

Tzinis, E., Venkataramani, S., Wang, Z., Subakan, C., & Smaragdis, P. (May 2020). Two-step sound source separation: Training on learned latent targets. In ICASSP 2020-2020 IEEE International Conference on Acoustics, Speech and Signal Processing (ICASSP) (pp. 31-35). IEEE.*

(Continued)

Primary Examiner — Bryan S Blankenagel
(74) Attorney, Agent, or Firm — William Park & Associates Ltd.

(57) ABSTRACT

Methods of encoding and decoding a speech signal using a neural network model that recognizes sound sources, and encoding and decoding apparatuses for performing the methods are provided. A method of encoding a speech signal includes identifying an input signal for a plurality of sound sources; generating a latent signal by encoding the input signal; obtaining a plurality of sound source signals by (Continued)

separating the latent signal for each of the plurality of sound sources; determining a number of bits used for quantization of each of the plurality of sound source signals according to a type of each of the plurality of sound sources; quantizing each of the plurality of sound source signals based on the determined number of bits; and generating a bitstream by combining the plurality of quantized sound source signals.

4 Claims, 12 Drawing Sheets

(56) References Cited

U.S. PATENT DOCUMENTS

| | | | |
|---|---|---|---|
| 9,336,796 B2 | 5/2016 | Jang et al. | |
| 10,388,275 B2 | 8/2019 | Kim et al. | |
| 10,956,787 B2* | 3/2021 | Rothberg | G16H 50/70 |
| 2020/0294512 A1* | 9/2020 | Ehara | G10L 19/20 |
| 2021/0104249 A1* | 4/2021 | Fotopoulou | G10L 19/03 |
| 2021/0141798 A1* | 5/2021 | Steedman Henderson | G06N 3/0454 |
| 2022/0199095 A1* | 6/2022 | Chang | G06N 3/08 |

OTHER PUBLICATIONS

Rickard, S. (Sep. 2006). Sparse sources are separated sources. In 2006 14th European signal processing conference (pp. 1-5). IEEE.*
Kai Zhen et al., Efficient and Scalable Neural Residual Waveform Coding With Collaborative Quantization, May 4-8, 2020, ICASSP, IEEE, Barcelona, Spain.
Di Wu, Single Channel Audio Separation Using Deep Neural Networks and Matrix Factorizations, Nov. 2017, Newcastle University, School of Electrical and Electronic Engineering Faculty of Science, Agriculture and Engineering.
Po-Sen Huang et al., Joint Optimization of Masks and Deep Recurrent Neural Networks for Monaural Source Separaton, IEEE/ACM Transactions on Audio, Speech, and Language Processing, vol. 23, No. 12, Dec. 2015, pp. 2136-2147.
Srihari Kankanahalli, End-to-End Optimized Speech Coding with Deep Neural Networks, pp. 2521-2525, IEEE, ICASSP 2018.

* cited by examiner

METHODS OF ENCODING AND DECODING SPEECH SIGNAL USING NEURAL NETWORK MODEL RECOGNIZING SOUND SOURCES, AND ENCODING AND DECODING APPARATUSES FOR PERFORMING THE SAME

CROSS-REFERENCE TO RELATED APPLICATION(S)

This application claims the benefit of U.S. Provisional Application No. 63/029,086 filed on May 22, 2020, in the U.S. Patent and Trademark Office, and claims the benefit of Korean Patent Application No. 10-2021-0053581 filed on Apr. 26, 2021, in the Korean Intellectual Property Office, the entire disclosures of which are incorporated herein by reference for all purposes.

BACKGROUND

1. Field of the Invention

One or more example embodiments relate to methods of encoding and decoding a speech signal using a neural network model that recognizes sound sources, and encoding and decoding apparatuses for performing the methods.

2. Description of the Related Art

Recently, with the development of deep learning technologies, as deep learning technologies are applied to coding technologies of video signals and audio signals, performance for various pattern recognition tasks including media compression and coding has been enhanced. In an example, a deep learning-based autoencoder exhibits superior compression performance to a related art, although a complexity thereof is slightly higher than that of the related art.

An autoencoder is a neural network model including an encoding model and a decoding model. The encoding model may encode an input signal to a latent signal, and the decoding model may decode the latent signal to an output signal. A coding technology based on a neural network is also applied to speech coding. In the related art, WaveNet, and cross-module residual learning (CMRL) technologies may be applied to speech coding.

When such a coding technology is applied to code a speech signal, various types of noise may be included in an actual speech signal. However, the coding technology according to the related art has a limitation in efficiently processing a speech signal containing noise.

Thus, there is a demand for a technology of efficiently coding a speech signal containing noise.

SUMMARY

Example embodiments provide a method and apparatus for encoding and decoding speech signals which may recognize sound sources in a latent space and separate speech signals to reduce a number of bits assigned to a speech signal of an unimportant sound source such as noise and increase a number of bits assigned to a speech signal of an important sound source. According to the example embodiments, a compression efficiency, and a quality of a speech signal to be reconstructed may be increased.

According to an aspect, there is provided a method of encoding a speech signal, the method including: identifying an input signal for a plurality of sound sources; generating a latent signal by encoding the input signal; obtaining a plurality of sound source signals by separating the latent signal for each of the plurality of sound sources; determining a number of bits used for quantization of each of the plurality of sound source signals according to a type of each of the plurality of sound sources; quantizing each of the plurality of sound source signals based on the determined number of bits; and generating a bitstream by combining the plurality of quantized sound source signals.

The obtaining of the plurality of sound source signals may include determining a masking vector for each of the plurality of sound sources, and determining the plurality of sound source signals from the latent signal using the masking vector.

The determining of the plurality of sound source signals may include separating the latent signal so that the plurality of sound source signals are orthogonal to each other, using the masking vector.

The masking vector may be a binary vector determined based on probabilities for each of the plurality of sound sources.

The quantizing of each of the plurality of sound source signals may include quantizing each of the plurality of sound source signals using softmax.

According to another aspect, there is provided a method of decoding a speech signal, the method including: identifying a bitstream generated by an encoder; extracting sound source signals quantized for a plurality of sound sources from the bitstream; inversely quantizing each of the quantized sound source signals; generating output signals for each of the plurality of sound sources by decoding each of the inversely quantized sound source signals; and obtaining a final output signal by combining the output signals for each of the plurality of sound sources.

According to another aspect, there is provided a method of encoding a speech signal, the method including: identifying an input signal for a plurality of sound sources; obtaining a plurality of quantized sound source signals by inputting the input signal to an encoding model; and generating a bitstream by combining the plurality of quantized sound source signals, wherein the encoding model is trained to obtain a plurality of sound source signals by separating a latent signal of the input signal for each of the plurality of sound sources, and to quantize each of the plurality of sound source signals according to a type of each of the plurality of sound sources.

The encoding model may be configured to generate the latent signal by encoding the input signal, to obtain the plurality of sound source signals by separating the latent signal for each of the plurality of sound sources, to determine a number of bits used for quantization of each of the plurality of sound source signals according to the type of each of the plurality of sound sources, and to quantize each of the plurality of sound source signals based on the determined number of bits.

The encoding model may be trained based on a difference between the input signal and an output signal reconstructed from the quantized sound source signals and a difference between entropy of the input signal and entropies of the quantized sound source signals.

According to another aspect, there is provided a method of decoding a speech signal, the method including: identifying a bitstream generated by an encoder; generating output signals for a plurality of sound sources by inputting the bitstream to a decoding model; and obtaining a final output signal by combining the output signals for the plurality of sound sources, wherein the decoding model is trained to extract sound source signals quantized for each of the plurality of sound sources from the bitstream and to generate the final output signal by decoding the quantized sound source signals.

The decoding model may be configured to inversely quantize each of the quantized sound source signals, to generate output signals for each of the plurality of sound sources by decoding each of the inversely quantized sound source signals, and to obtain the final output signal by combining the output sources for each of the plurality of sound sources.

The decoding model may be trained based on a difference between an input signal and the final output signal and a difference between entropy of the input signal and entropies of the quantized sound source signals.

According to another aspect, there is provided an encoder for performing a method of encoding a speech signal. The encoder may include a processor, and the processor may be configured to identify an input signal for a plurality of sound sources, generate a latent signal by encoding the input signal, obtain a plurality of sound source signals by separating the latent signal for each of the plurality of sound sources, determine a number of bits used for quantization of each of the plurality of sound source signals according to a type of each of the plurality of sound sources, quantize each of the plurality of sound source signals based on the determined number of bits, and generate a bitstream by combining the plurality of quantized sound source signals.

The processor may be configured to determine a masking vector for each of the plurality of sound sources and determine the plurality of sound source signals from the latent signal using the masking vector.

The processor may be configured to separate the latent signal so that the plurality of sound source signals are orthogonal to each other, using the masking vector.

The masking vector may be a binary vector determined based on probabilities for each of the plurality of sound sources.

The processor may be configured to quantize each of the plurality of sound source signals using softmax.

According to another aspect, there is provided a decoder for performing a method of decoding a speech signal. The decoder may include a processor, and the processor may be configured to identify a bitstream generated by an encoder, extract sound source signals quantized for a plurality of sound sources from the bitstream, inversely quantize each of the quantized sound source signals, generate output signals for each of the plurality of sound sources by decoding each of the inversely quantized sound source signals, and obtain a final output signal by combining the output signals for each of the plurality of sound sources.

Additional aspects of example embodiments will be set forth in part in the description which follows and, in part, will be apparent from the description, or may be learned by practice of the disclosure.

According to example embodiments, in a process of encoding and decoding speech signals, sound sources may be recognized in a latent space and speech signals may be separated, and thus it is possible to reduce a number of bits assigned to a speech signal of an unimportant sound source such as noise and increase a number of bits assigned to a speech signal of an important sound source. Therefore, it is possible to increase a compression efficiency, and a quality of a speech signal to be reconstructed.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
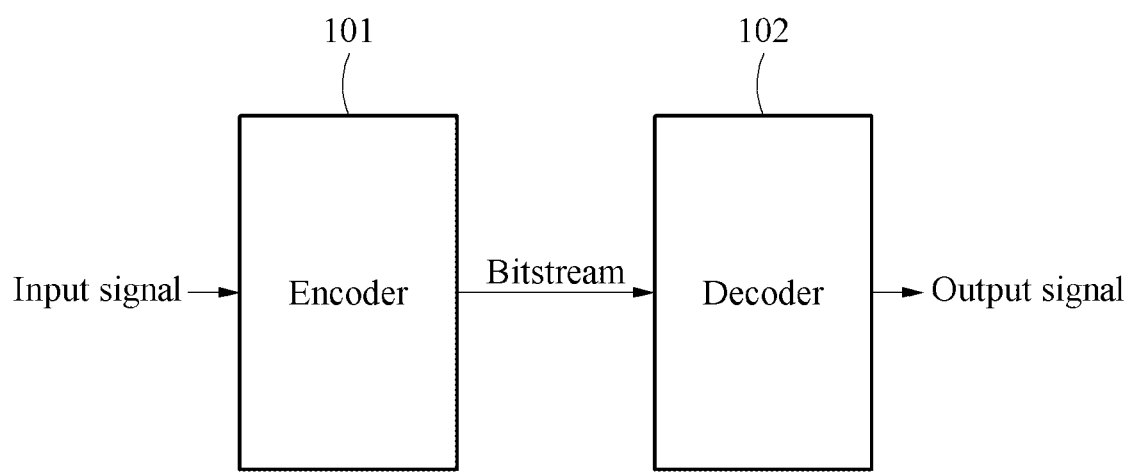
FIG. 1 is a diagram illustrating an encoder and a decoder according to an example embodiment.

Hereinafter, example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related technologies will be omitted when it is deemed that such description will cause ambiguous interpretation of the present disclosure.

FIG. 1 is a diagram illustrating an encoder and a decoder according to an example embodiment.

According to example embodiments, in a process of encoding and decoding speech signals, speech signals may be separated for each of sound sources, to reduce a number of bits assigned to a speech signal of an unimportant sound source such as noise and to increase a number of bits assigned to a speech signal of an important sound source. Thus, it is possible to increase a compression efficiency, and a quality of a speech signal to be reconstructed. In an example, the example embodiments may provide encoding and decoding methods for effectively processing a speech signal containing noise.

An encoder 101 may include a processor. The processor in the encoder 101 may perform an encoding method according to an example embodiment. A decoder 102 may include a processor. The processor in the decoder 102 may perform a decoding method according to an example embodiment.

Referring to FIG. 1, the encoder 101 may identify an input signal and encode the input signal, to generate a bitstream. The decoder 102 may generate a final output signal by decoding the bitstream. According to an example embodiment, the encoder 101 and the decoder 102 may be the same electronic devices.

The input signal may refer to an original speech signal for a plurality of sound sources. The input signal may be a speech signal in which speech signals from a plurality of sound sources are mixed. An input signal for a plurality of sound sources may include noise generated in a surrounding environment as well as speech signals generated by real people. An output signal may refer to a speech signal reconstructed by encoding and decoding an input signal.

The encoder 101 may identify the input signal. The encoder 101 may obtain a plurality of quantized sound source signals by inputting the input signal to an encoding model. The encoder 101 may generate a bitstream by combining the plurality of quantized sound source signals.

The decoder 102 may identify the bitstream generated by the encoder 101. The decoder 102 may generate output signals for a plurality of sound sources by inputting the bitstream to a decoding model. The decoder 102 may obtain the final output signal by combining the output signals for the plurality of sound sources.

The encoding model and the decoding model may be included in a neural network model. The neural network model including the encoding model and the decoding model may have a structure of a deep learning-based end-to-end autoencoder. The neural network model may generate an output signal from an input signal. The neural network model may generate an output signal by encoding and decoding an input signal.

The encoding model may be trained to obtain a plurality of sound source signals by separating a latent signal of the input signal for each of the plurality of sound sources, and to quantize each of the plurality of sound source signals according to a type of each of the sound sources. The latent signal may refer to a latent vector in a latent space.

The encoding model may generate the latent signal by encoding the input signal, may obtain the plurality of sound source signals by separating the latent signal for each of the plurality of sound sources, may determine a number of bits used for quantization of each of the plurality of sound source signals according to the type of each of the sound sources, and may quantize each of the plurality of sound source signals based on the determined number of bits.

The encoding model may generate the latent signal by extracting a feature of the input signal. In an example, a latent signal, as a compressed input signal, may refer to a latent feature vector. A sound source signal may refer to a latent signal for a specific sound source. For example, a latent signal may be separated into a sound source signal corresponding to speech and a sound source signal corresponding to noise.

The decoding model may be trained to extract sound source signals quantized for each of the plurality of sound sources from the bitstream and to generate the final output signal by decoding the quantized sound source signals.

The decoding model may inversely quantize each of the quantized sound source signals, may generate output signals for each of the plurality of sound sources by decoding each of the inversely quantized sound source signals, and may obtain the final output signal by combining the output sources for each of the plurality of sound sources.

The encoding model and the decoding model may be trained by the encoder 101 or the decoder 102. In an example, the encoding model and the decoding model may be trained based on a difference between the input signal and an output signal reconstructed from the quantized sound source signals and a difference between entropy of the input signal and entropies of the quantized sound source signals.

The neural network model may perform sound source separation and coding of a speech signal. All operations processed by the neural network model may be performed by the processor in the encoder 101 or the processor in the decoder 102.

Figure 2:
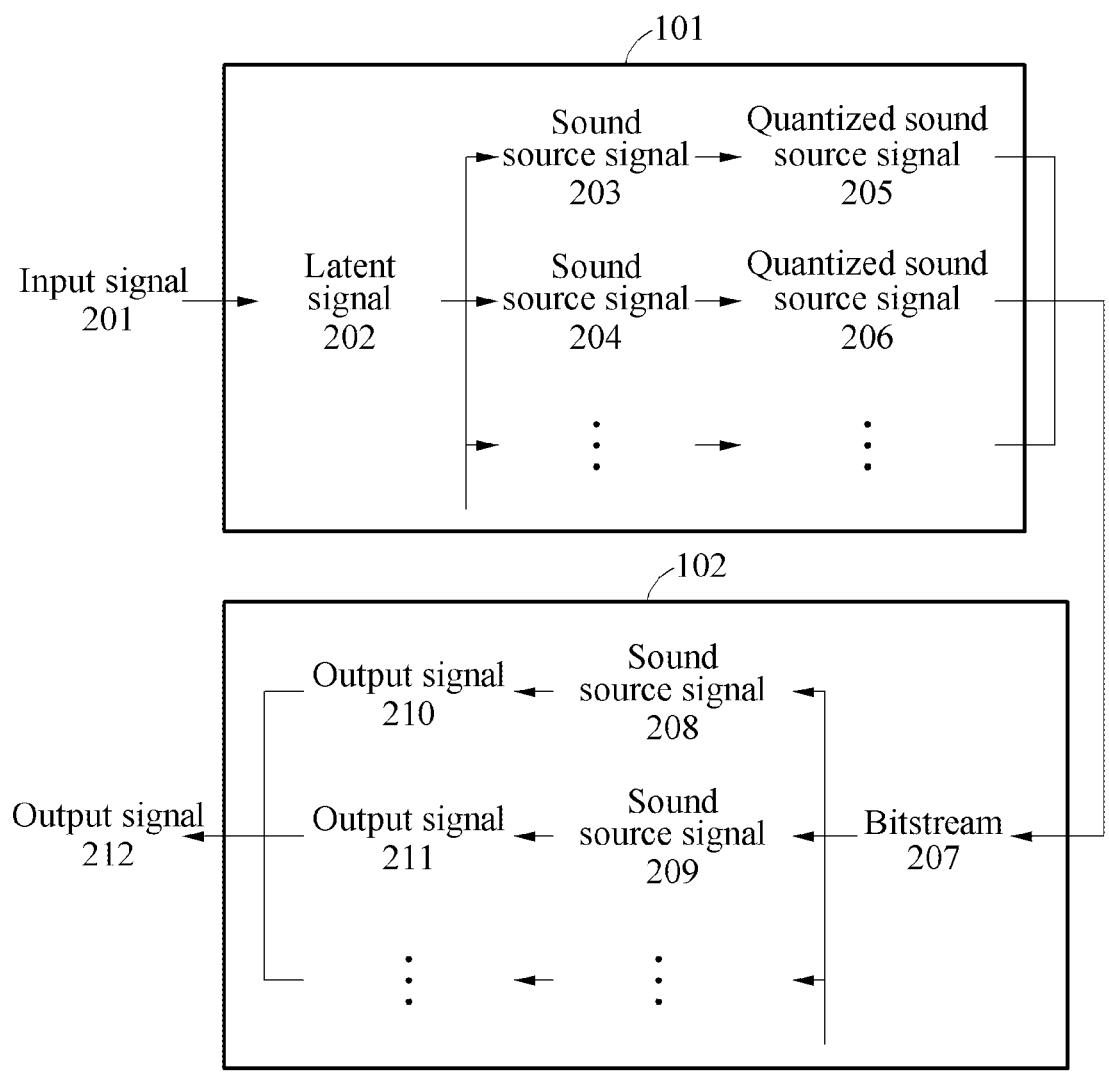
FIG. 2 is a diagram illustrating a process in which data is processed in an encoder and a decoder according to an example embodiment.

FIG. 2 is a diagram illustrating a process in which data is processed in an encoder and a decoder according to an example embodiment.

A process in which an input signal 201 is encoded and decoded as shown in FIG. 2 may be performed in a neural network model. An encoder 101 may identify the input signal 201. The encoder 101 may generate a latent signal 202 by encoding the input signal 201.

In an example, the encoder 101 may encode the input signal 201 using a convolution operation. In another example, the encoder 101 may encode the input signal 201 using a structure of a neural network shown in FIG. 3. A method of generating the latent signal 202 by encoding or compressing the input signal 201 is not limited to a specific example, and other methods may be adopted by ordinary skill in the art.

The encoder 101 may obtain a plurality of sound source signals 203 and 204 by separating the latent signal 202 for each of a plurality of sound sources. The encoder 101 may perform sound source separation in the latent space. The encoder 101 may reduce a complexity of an encoding process using an orthogonality assumption between the sound source signals 203 and 204 for each sound source.

In an example, the input signal 201 may be a time-domain signal and may include a plurality of frames. The input signal 201 may satisfy Equation 1 shown below. The latent signal 202 may satisfy Equation 2 shown below.

$$x = \in \mathbb{R}^N \qquad \text{[Equation 1]}$$

$$z \in \mathbb{R}^D : z \leftarrow \mathcal{F}_{ene(x)} \qquad \text{[Equation 2]}$$

In Equation 1, x may denote the input signal 201, and may denote, for example, a frame of an input signal. $\mathbb{R}^N$ may denote an N-dimensional real number space, and $\mathbb{R}^D$ may denote a D-dimensional real number space. Also, z may denote the latent signal 202. $F_{ene}()$ may denote an arbitrary encoding function.

The encoder 101 may determine masking vectors for each of the plurality of sound sources. The encoder 101 may determine the plurality of sound source signals 203 and 204 from the latent signal 202 using a masking vector. In an example, for "K" sound sources, a masking vector that decomposes the latent signal 202 into "K" signals may be determined. A value of a masking vector may be determined based on probabilities for each of the plurality of sound sources. For example, probabilities for each sound source may satisfy Equation 3 shown below.

$$\sum_{k=1}^{K} m_d^{(k)} = 1 \qquad \text{[Equation 3]}$$

In Equation 3, $m_d^{(k)}$ may denote a probability of a k-th sound source. Also, d may denote an index of a dimension, and K may denote a number of sound sources. In other words, a sum of probabilities for all sound sources may be "1". However, in the present disclosure, a masking vector may be determined based on probabilities for each sound source, according to Equation 4 shown below.

$$m_d^{(k)} = \begin{cases} 1 & \text{if argmax}_j m_d^{(j)} = k \\ 0 & \text{otherwise} \end{cases} \qquad \text{[Equation 4]}$$

In Equation 4, $m_d^{(k)}$ may denote a masking vector for a k-th sound source. A k-th masking vector may be a binary vector determined based on a probability of the k-th sound source. The encoder 101 may use an argmax operation to determine a masking vector. Due to a masking vector including "1" or "0", the sound source signals 203 and 204 may be orthogonal to each other. In an example, each of the sound source signals 203 and 204 for the plurality of sound sources may satisfy Equations 5 and 6 shown below.

$$z^{(1)} \perp z^{(2)} \text{TM} \ldots z^{(K)} \qquad \text{[Equation 5]}$$

$$z^{(k)} = m^{(k)} \odot z \qquad \text{[Equation 6]}$$

In Equation 6, $z^{(k)}$ may denote the sound source signals 203 and 204 for the k-th sound source. Also, z may denote the latent signal 202, and $m^{(k)}$ may denote a masking vector for the k-th sound source. $\odot$ may denote a Hadamard product operation.

According to an example embodiment, a value of a masking vector may not be determined for each frame, and a masking vector that separates the latent signal 202 into "K" exclusive and consecutive subsets may be used. Each of the subsets may refer to the sound source signals 203 and 204. The encoder 101 may separate the latent signal 202 using the masking vector so that the plurality of sound source signals 203 and 204 may be orthogonal to each other.

For example, when two types of sound sources are present and when the latent signal 202 is included in an eight-dimensional (8D) real number space, a masking vector may be represented by Equation 7 shown below.

$$m^{(1)} = [1, 1, 1, 1, 0, 0, 0, 0]^T \qquad \text{[Equation 7]}$$

In Equation 7, $m^{(1)}$ may denote a masking vector for a first sound source. Since a masking vector is a binary vector, masked-out elements may be discarded. When the masked-out elements are discarded, the sound source signals 203 and 204 may be included in a D/K dimensional real number space as shown in Equation 8 below. K may denote a number of sound sources, and D may denote a number of dimensions of the latent signal 202 at an original stage.

$$z^{(k)} \in \mathbb{R}^{D/K} \qquad \text{[Equation 8]}$$

In an example, the latent signal 202 may be defined by the sound source signals 203 and 204 by discarding the masked-out elements, as shown in Equation 9 below. $z^{(k)}$ may denote a k-th sound source signal, for example, the sound source signal 203 or 204.

$$z = [z^{(1)^T}, z^{(2)^T}, \ldots, z^{(K)^T}]^T \qquad \text{[Equation 9]}$$

In Equation 9, z may denote the latent signal 202, and $z^{(k)}$ may denote a k-th sound source signal, for example, the sound source signal 203 or 204. In an example, the encoder 101 may encode the input signal 201 using an encoding block included in the encoding model. A structure of the encoding block will be described below with reference to FIG. 3. The encoding block may have a structure of a one-dimensional (1D) convolutional neural network (CNN). The encoding block may include a convolution layer that performs a convolution operation.

Input data and output data of the encoding block may be the input signal 201 and the latent signal 202, respectively. In an example, the output data of the encoding block may be a 2L×P matrix. L may represent a number of channels of the input signal 201, or a number of 2L output channels of a CNN. P may represent a length of the input signal 201.

For example, when two sound sources are provided, the latent signal 202 may be separated into two sound source signals 203 and 204 corresponding to an L×P matrix. LP may be identical to D/K. D may be a multiple of K. A decoder 102 may generate an output signal 212 from each of the sound source signals 203 and 204 obtained by separating the latent signal 202 for each sound source.

The encoder 101 may determine a number of bits used for quantization of each of the plurality of sound source signals 203 and 204 according to a type of sources. The number of bits according to the type of sound sources may be determined in advance. The number of bits according to the type of sound sources may be determined differently depending on an importance of each of the sound sources.

In an example, the encoder 101 may differently determine a number of bits for each of the sound source signals 203 and 204 according to the type of sound sources. In another example, the encoder 101 may differently determine a number of bits for each of the sound source signals 203 and 204 according to an importance of each of the sound sources.

For example, due to a high importance of speech, a large number of bits used for quantization may be determined. Due to a low importance of noise, a small number of bits used for quantization may be determined. In an example, an importance of a sound source may be proportional to a number of bits used for quantization of a sound source signal (for example, the sound source signals 203 and 204) of the sound source.

The encoder 101 may quantize each of the plurality of sound source signals 203 and 204 based on the determined number of bits. The quantizing may refer to a process of mapping successive variables to discrete representative values. In the present disclosure, soft-to-hard quantization using a softmax operation may be used to quantize the sound source signals 203 and 204 for each of the plurality of sound sources. The soft-to-hard quantization may compensate for a difficulty in use of a neural network model because a quantization process is not a differentiable process.

The soft-to-hard quantization may formulate a cluster assignment process as a softmax classification during a feed-forward process. The encoder 101 may quantize each of the plurality of sound source signals 203 and 204 using softmax.

The encoder 101 may calculate a Euclidean distance vector for all representative values (for example, a cluster mean). A negative representative value may function as a similarity score for a softmax function.

The encoder 101 may quantize the sound source signals 203 and 204 based on a softmax result. The softmax result may be a probability vector of a cluster. For example, quantized sound source signals 205 and 206 may be determined according to Equations 10 to 13 shown below.

$$d_m = \mathcal{E}(y\|\mu_m)$$ [Equation 10]

$$p = \text{Softmax}(-\alpha d)$$ [Equation 11]

$$\overline{y} = \mu_{argmax_m p_m}$$ [Equation 12]

$$\overline{y} = \sum_{m=1}^{M} p_m \mu_m$$ [Equation 13]

In Equation 10, $d_m$ may denote a Euclidean distance for an m-th representative value. Also, y may denote a sound source signal (for example, the sound source signals 203 and 204) for a specific sound source. μm may be a cluster centroid indicating the m-th representative value. ε may be a function that calculates a Euclidean distance.

In Equation 11, p may be a probability vector indicating a softmax result. Sotfmax( ) may denote a softmax function. Also, α may denote a scaling hyperparameter. α may be determined to reduce an inconsistency between the quantized sound source signals 205 and 206 used in a training process and the quantized sound source signals 205 and 206 used in a process of applying the encoding model.

In Equation 12, $\overline{y}$ may refer to quantized sound source signals 205 and 206 that are calculated in a process of actually applying a trained encoding model. On the contrary, in Equation 13, $\overline{y}$ may refer to quantized sound source signals 205 and 206 that are calculated in a process of training the encoding model. Since it is difficult to differentiate Equation 12, the sound source signals 203 and 204 may be quantized according to Equation 13 in the process of training the encoding model.

In Equations 12 and 13, $p_m$ may denote a probability vector of softmax for the m-th representative value. According to Equation 12, in the process of applying the encoding model, the sound source signals 203 and 204 may be quantized as a closest representative value.

In the process of training the encoding model, the cluster centroid may also be updated as a parameter of the neural network model. The soft-to-hard quantization may perform vector quantization.

A theoretical lower bound of a bitrate caused by Huffman coding may be defined by entropies of the quantized sound source signals 205 and 206. A frequency of a cluster mean may define the entropies of the sound source signals 205 and 206 as shown in Equation 14 below.

$$\mathcal{H}(\mu^{(k)}) = -\sum_{m=1}^{M} q_m^{(k)} \log q_m^{(k)}$$ [Equation 14]

In Equation 14, $q_m^{(k)}$ may denote a frequency of an m-th cluster mean for the k-th sound source. $\mu^{(k)}$ may denote a cluster centroid of the k-th sound source (for example, the sound source signals 203 and 204). Also, H( ) may be a function that calculates entropy. In addition, entropy of a mixed speech signal may be less than or equal to a sum of entropies of the sound source signals 203 and 204 for the plurality of sound sources, as shown in Equation 15 below.

$$\mathcal{H}(\mu) \leq \sum_{k=1}^{K} \mathcal{H}(\mu^{(k)})$$ [Equation 15]

In Equation 15, $\mu^{(k)}$ may denote a cluster centroid of the k-th sound source. K may denote a number of sound sources. H( ) may be a function that calculates entropy. $\ddot{\mu}$ may denote a cluster centroid of the mixed speech signal. According to Equation 15, quantizing of the plurality of sound source signals 203 and 204 may be disadvantageous to a coding efficiency. However, according to an example embodiment, a benefit of using perceptual factors may be provided.

In an example, by performing quantization with different bitrates for each sound source, a sound source signal of an important sound source recognized by humans may be quantized at a higher bitrate than a sound source signal of other sound sources such as noise, so that a reconstruction quality may increase. Thus, a perceptual quality of an important sound source such as speech in the final output signal 212 may increase. Also, the coding efficiency may be promoted by lowering a bitrate of an unimportant sound source such as noise.

According to an example embodiment, an entropy control mechanism of setting a loss between actual entropy and target entropy for each of the sound source signals 203 and 204 and training a neural network model may be used. In other words, both a difference between the input signal 201 and the output signal 212 reconstructed from the quantized sound source signals 205 and 206 and a difference between target entropy that is the entropy of the input signal 201 and the entropies of the quantized sound source signals 205 and 206 may be used to update parameters of the neural network model.

In an example, a difference between entropies may be used to determine a loss function of the neural network model, as shown in Equation 16 below.

$$(\xi^{(k)} - \mathcal{H}(\mu^{(K)}))^2$$ [Equation 16]

In Equation 16, $\xi^{(k)}$ may denote the total entropy of the input signal 201 of the k-th sound source, and H($\mu^{(k)}$) may denote entropies of the sound source signals 203 and 204 of the k-th sound source. As an experimental result, a loss value for entropy may not guarantee an exact bitrate, but may not have a great influence on performance despite the difference between the actual entropy and the target entropy.

The encoder 101 may convert the quantized sound source signals 205 and 206 to a bitstream 207. The encoder 101 may generate the bitstream 207 corresponding to the quantized sound source signals 205 and 206. The decoder 102 may identify the bitstream 207. The decoder 102 may generate output signals 210 and 211 for the plurality of sound sources by inputting the bitstream 207 to a decoding model.

The decoding model may include a feature transformation block that transforms the inversely quantized sound source signals 208 and 209, and a decoding block that generates the output signals 210 and 211 for each of the plurality of sound sources from the inversely quantized sound source signals 208 and 209.

For example, the decoder 102 may extract the quantized sound source signals 205 and 206 from the bitstream 207. The decoder 102 may inversely quantize each of the quantized sound source signals 205 and 206. The decoder 102 may transform the inversely quantized sound source signals 208 and 209 using the feature transformation block. The feature transformation block may include neural network layers including weights, and may be a block that transforms input data so that decoding may be effectively performed. A weight of the feature transformation block may be updated so that a decoding quality in a process of training the decoding model may increase.

The decoder 102 may generate the output signals 210 and 211 for each of the plurality of sound sources by decoding each of the inversely quantized sound source signals 208 and 209. The decoder 102 may obtain the final output signal 212 by combining the output signals 210 and 211 for each of the plurality of sound sources.

The encoding model and the decoding model may be trained by the encoder 101 or the decoder 102. In an example, the encoding model and the decoding model may be trained based on a difference between the input signal 201 and the output signal 212 reconstructed from the quantized sound source signals 205 and 206 and a difference between the entropy of the input signal 201 and the entropies of the quantized sound source signals 205 and 206.

In an example, the encoder 101 or the decoder 102 may determine a loss value based on the difference between the input signal 201 and the output signal 212 reconstructed from the quantized sound source signals 205 and 206 and the difference between the entropy of the input signal 201 and the entropies of the quantized sound source signals 205 and 206.

The encoder 101 or the decoder 102 may update parameters of the encoding model and the decoding model so that the loss value may be minimized. The encoding model and the decoding model may perform a backpropagation based on the determined loss value.

In an example, when the type of sound sources is speech and noise, the loss value may be determined according to Equation 17 shown below.

$$\mathcal{L} = \lambda_{MSE}(\mathcal{E}_{MSE}(s\|\hat{s}) + \mathcal{E}_{MSE}(x\|\hat{x}))$$
$$+ \lambda_{EntTot}(\xi - \mathcal{H}(\mu^{(1)}) - \mathcal{H}(\mu^{(2)}))^2$$
$$+ \lambda_{Ratio}\left(\psi - \frac{\mathcal{H}(\mu^{(1)})}{\mathcal{H}(\mu^{(2)})}\right)^2,$$

[Equation 17]

In Equation 17, L may denote a loss value. s may denote the input signal 201 for speech, and ŝ may denote the output signal 212 for speech. X may denote the input signal 201 for all sound sources, and x̂ may denote the final output signal 212. $\varepsilon_{mse(\ )}$ may be a function that calculates a mean square error. λ may denote a weight and may not be limited to a specific value.

In addition, ξ may denote the total entropy of the input signal 201 for all sound sources to be targeted for training. $H(\mu^{(1)})$ may denote entropy of a sound source signal of a first sound source (for example, speech). $H(\mu^{(2)})$ may denote entropy of a sound source signal of a second sound source (for example, noise). ψ may denote a target ratio.

In other words, the encoder 101 or the decoder 102 may train the encoding model and the decoding model, further based on a difference between an entropy ratio of input signals 201 for each sound source and an entropy ratio of the quantized sound source signals 205 and 206.

According to an example embodiment, different bitrates may be applied based on perceptual and applicational importance to encode and decode non-speech components as well as speech components, instead of simply encoding speech only, and thus it is possible to provide an enhanced acoustic environment.

Figure 3:
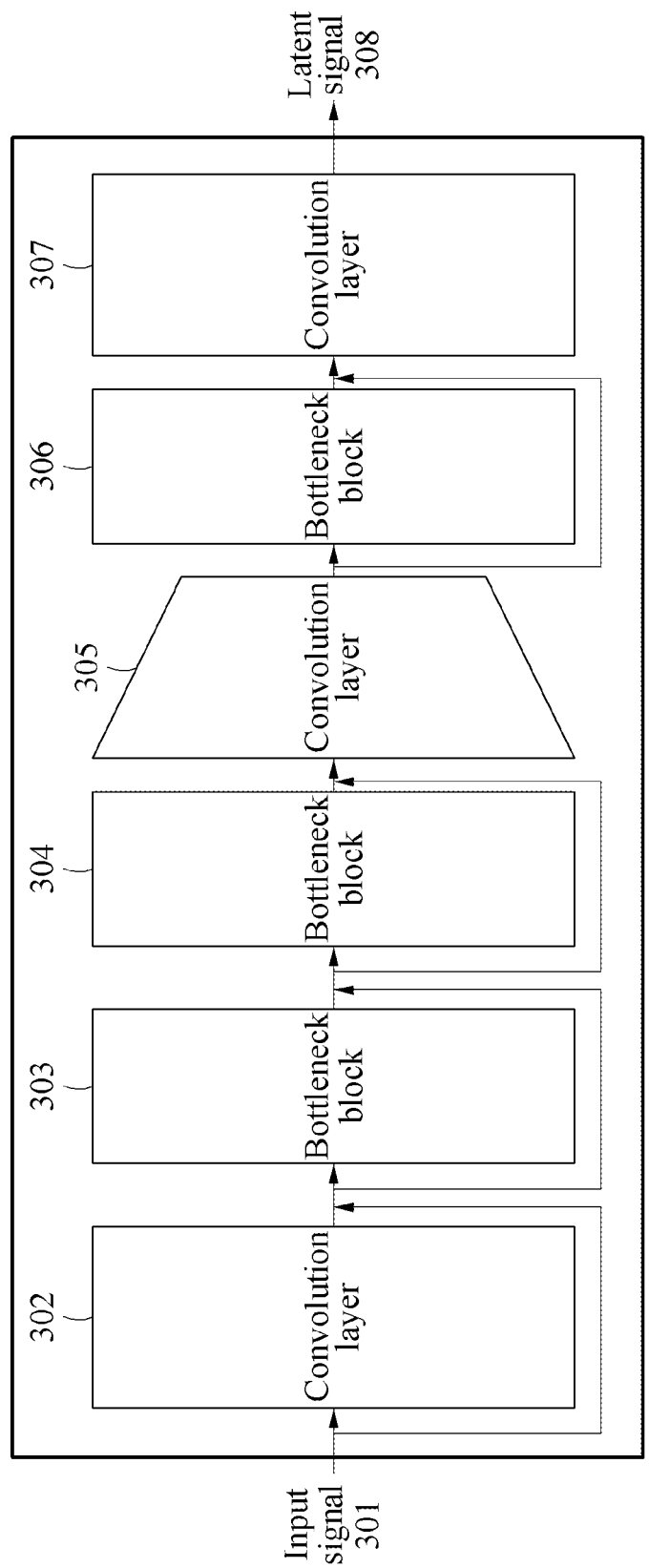
FIG. 3 is a block diagram illustrating a structure of an encoding block according to an example embodiment.

FIG. 3 is a block diagram illustrating a structure of an encoding block according to an example embodiment.

An encoding model may include an encoding block that generates a latent signal 308 from an input signal 301, and a quantization block that quantizes a sound source signal. The encoding block included in the encoding model may include convolution layers 302, 305, and 307, and bottleneck blocks 303, 304, and 306. The bottleneck blocks 303, 304, and 306 may have the same input channel. All blocks or layers may include parameters for an operation.

In an example, the convolution layer 302 may perform a 1D convolution operation, to increase a channel of the input signal 301 and generate a feature vector. The input signal 301 may be transformed to a feature vector through the convolution layer 302.

In an example, the bottleneck blocks 303, 304, and 306 may have a structure of a residual neural network (ResNet). The bottleneck blocks 303, 304, and 306 may reduce a depth of the feature vector and recover the depth back to the original depth. For example, input data and output data of the bottleneck block 303 may be connected via an identity shortcut.

The connected data may be used as input data of a next bottleneck block, that is, the bottleneck block 304. In the convolution layer 305, a 1D convolution operation may be performed, and output data of the bottleneck block 304 may be down-sampled to ½. A down-sampled feature vector may be transformed to the latent signal 308 through the bottleneck block 306 and the convolution layer 307. In a convolution layer, a channel of the feature vector may be reduced, and the latent signal 308 may be generated.

Figure 4:
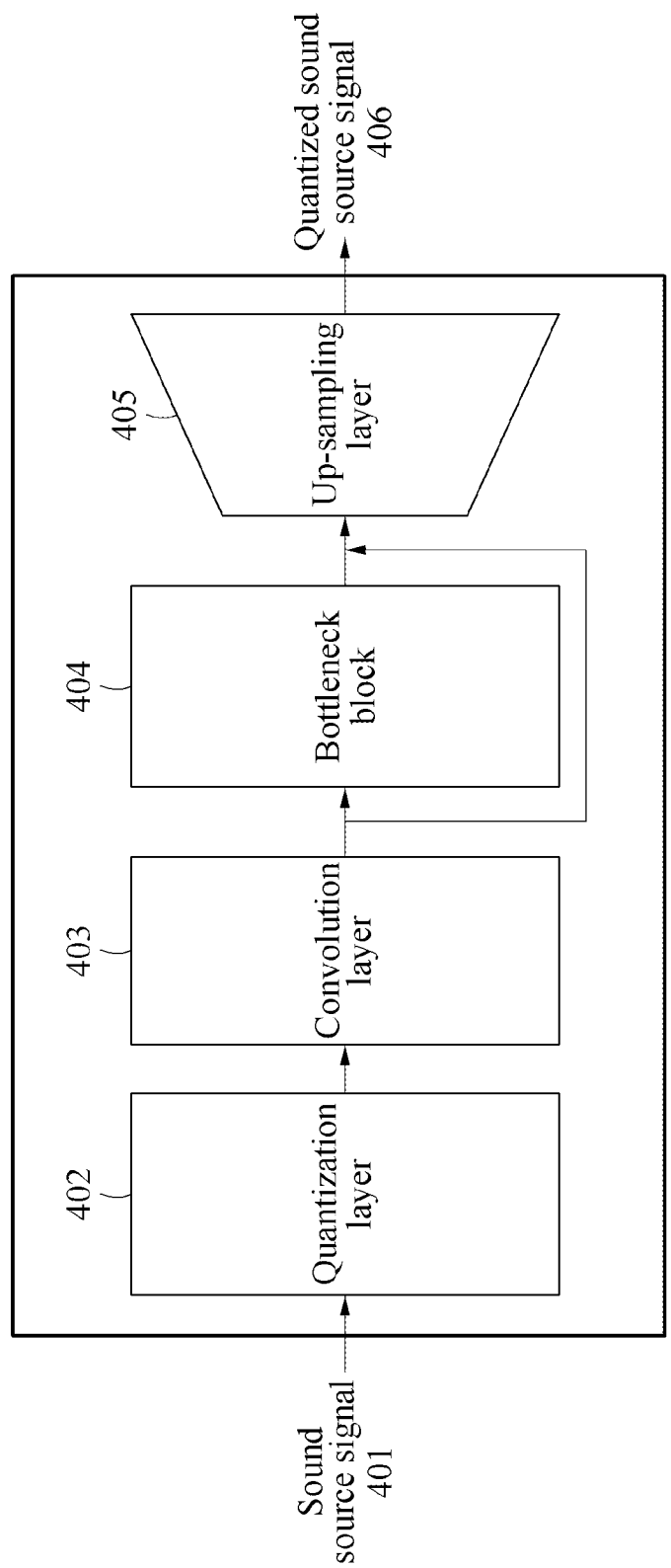
FIG. 4 is a block diagram illustrating a structure of a quantization block according to an example embodiment.

FIG. 4 is a block diagram illustrating a structure of a quantization block according to an example embodiment.

An encoding model may include a quantization block that performs quantization of a sound source signal 401. The quantization block may include a quantization layer 402, a convolution layer 403, a bottleneck block 404, and an up-sampling layer 405. The quantization block may quantize the sound source signal 401. All blocks or layers may include parameters for an operation.

In the quantization layer 402, the sound source signal 401 may be quantized. In an example, soft-to-hard vector quantization may be performed on the sound source signal 401. In the convolution layer 403, a 1D convolution operation may be performed and a channel may increase. The bottleneck block 404 may be a block having a structure of a ResNet. The bottleneck block 404 may reduce a depth of input data and recover the depth back to generate output data.

In the up-sampling layer 405, a feature vector may be up-sampled by two times in a length. Up-sampling may be performed by combining two adjacent channels into one channel. For example, a sub-pixel convolution technique may be applied. Through the up-sampling layer 405, a quantized sound source signal 406 may be generated.

Figure 5:
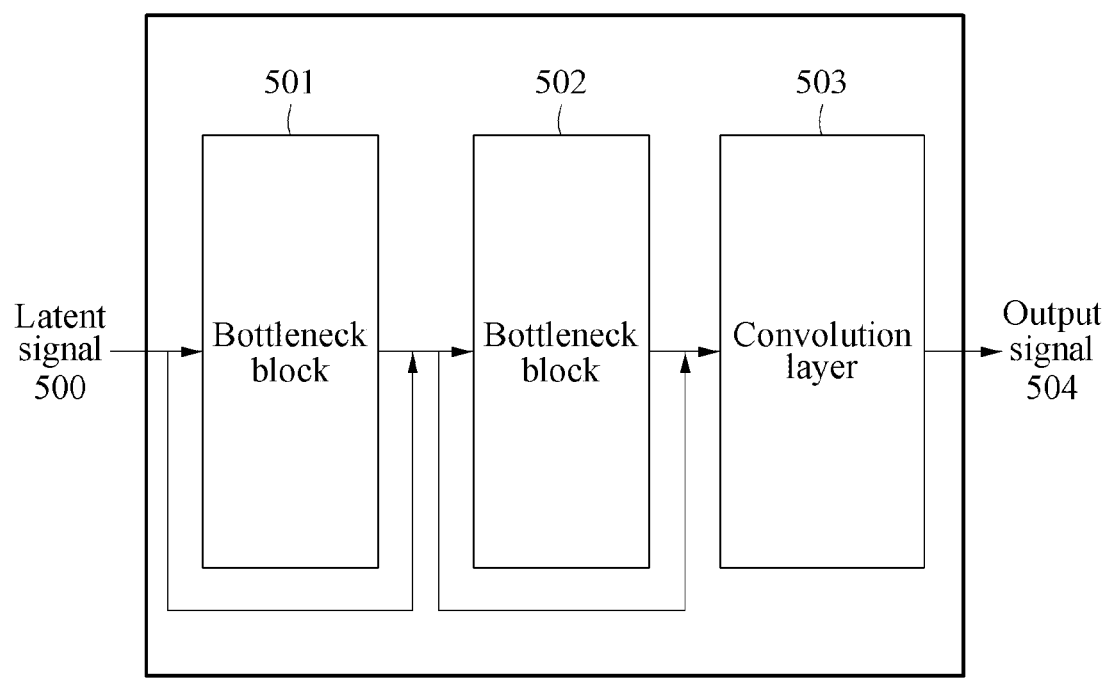
FIG. 5 is a block diagram illustrating a structure of a decoding block according to an example embodiment.

FIG. 5 is a block diagram illustrating a structure of a decoding block according to an example embodiment.

A decoding model may include a decoding block that generates an output signal 504 of a sound source from a sound source signal of the sound source. A latent signal 500 of FIG. 5 may refer to inversely quantized sound source signals. The decoding block may include bottleneck blocks 501 and 502, and a convolution layer 503. All blocks or layers may include parameters for operations.

The bottleneck blocks 501 and 502 may each be a block having a structure of a ResNet. The bottleneck blocks 501 and 502 may generate output data by reducing a depth of input data and recovering the depth. In the convolution layer 503, a 1D convolution operation may be performed, and a channel of an inversely quantized sound source signal may be converted to "1". The output signal 504 for the sound source signal may be generated through the convolution layer 503.

FIGS. 6A to 6D are graphs illustrating experimental results according to an example embodiment.

The graphs of FIGS. 6A to 6D show experimental results for an objective evaluation. For experiments, "500" and "50" utterances are selected from TIMIT corpus and are combined with sound of non-stationary sound sources corresponding to noise (for example, birds, guns, ocean, jungle, fog, chewing, typing, casino, motorcycle, and the like), to be used as an input signal.

An input signal may be segmented into "512" samples (32 ms) with overlap of "64" samples. In experiments, a Hann window with a size of "128" is applied to a period of "64" overlapping samples. Accordingly, 16000/448 frames per second may be used, and each frame may be transformed for a target sound source signal for vector quantization. For entropy $\xi$ of a sound source-specific codebook, a bitrate may be determined to be 16000P/448. For example, if P is 256 and $\xi$ is 1, a bitrate may be determined as 9.14 kbps.

Training may be performed by three stages. Here, when performance is not improved during three consecutive epochs, training may be set to proceed to a next stage. Also, when performance is not improved for ten epochs in total in a training process, training may be stopped.

In a first stage, a separate model may be trained to cancel noise without an encoding process. Here, an encoder may be trained to separate a sound source into speech and background sources represented by two orthogonal code vectors. The above process may not include a quantization process yet, but an appropriate initialization of quantization vector centroids between sound sources may be trained.

In a second stage, training may be performed so that soft-to-hard vector quantization may be properly performed. "128" cluster centroids may be used. A scale (for example, a in Equation 11) of a softmax function may be determined to be "10", and may be exponentially increased to "500". Meanwhile, parameters of the encoding model may be updated so that a quantization error may be minimized.

In a third stage, training may be performed based on entropy. In an example, a regularization weight (for example, $\lambda$ in Equation 17) may be determined to be ⅕ of the total entropy and to be 1/60 of an entropy ratio. Target total entropy $\xi$ may be set to be 1, 2, and 3, based on a target bitrate, and accordingly bitrates may be determined to be 9.14, 18.29, and 27.43 kbps. A target ratio (for example, $\psi$ in Equation 17) may be determined to be 3.

In FIGS. 6A to 6D, source-aware neural audio coding (SANAC) 601 may refer to a codec set to be 0 dB according to an example embodiment, and SANAC 603 may refer to a codec set to be 5 dB according to an example embodiment. A baseline 602 may refer to a reference codec set to be 0 dB, and a baseline 604 may refer to a reference codec set to be 5 dB.

The reference codec may perform encoding and decoding without taking into consideration entropy or an output signal for each sound source. The graphs of FIGS. 6A to 6D show results obtained by performing experiments based on a scale-invariant signal-to-distortion ratio (Si-SDR) and short-time objective intelligibility for both a speech signal including only speech and a speech signal including speech and noise.

Figure 6A:
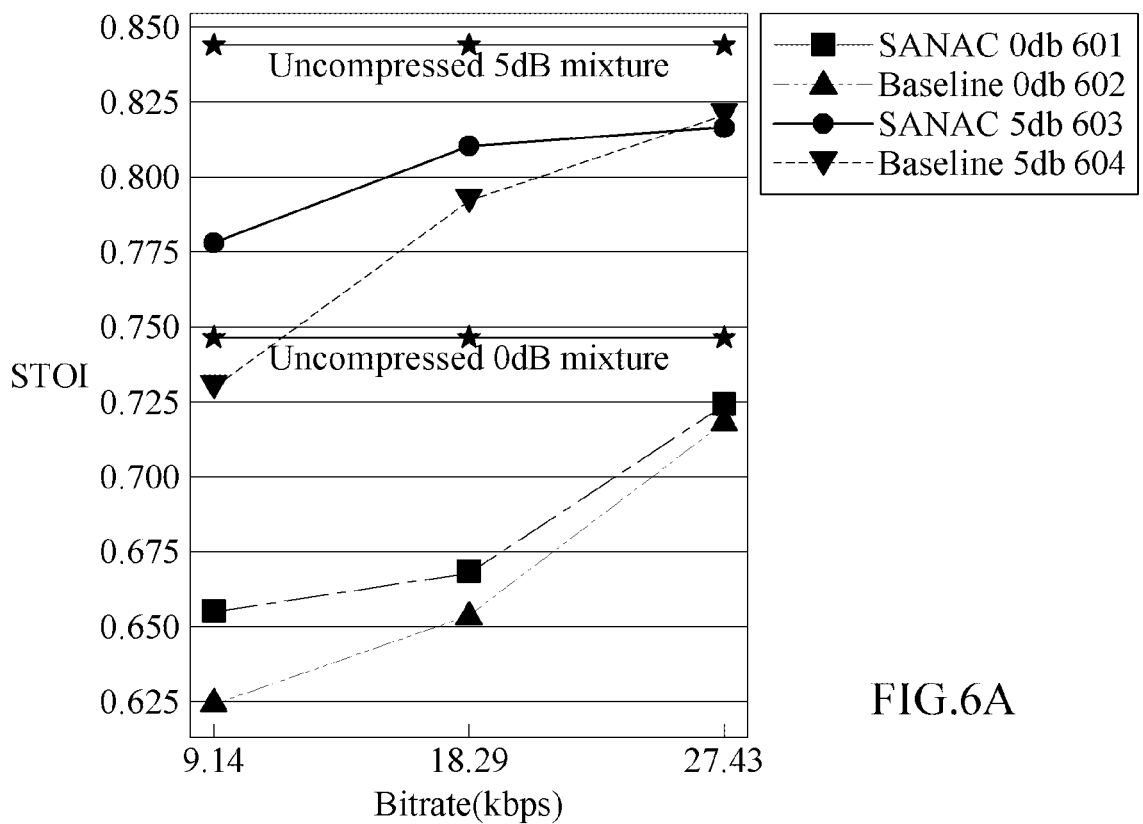
FIGS. 6A to 6D are graphs illustrating experimental results according to an example embodiment.
Figure 6B:
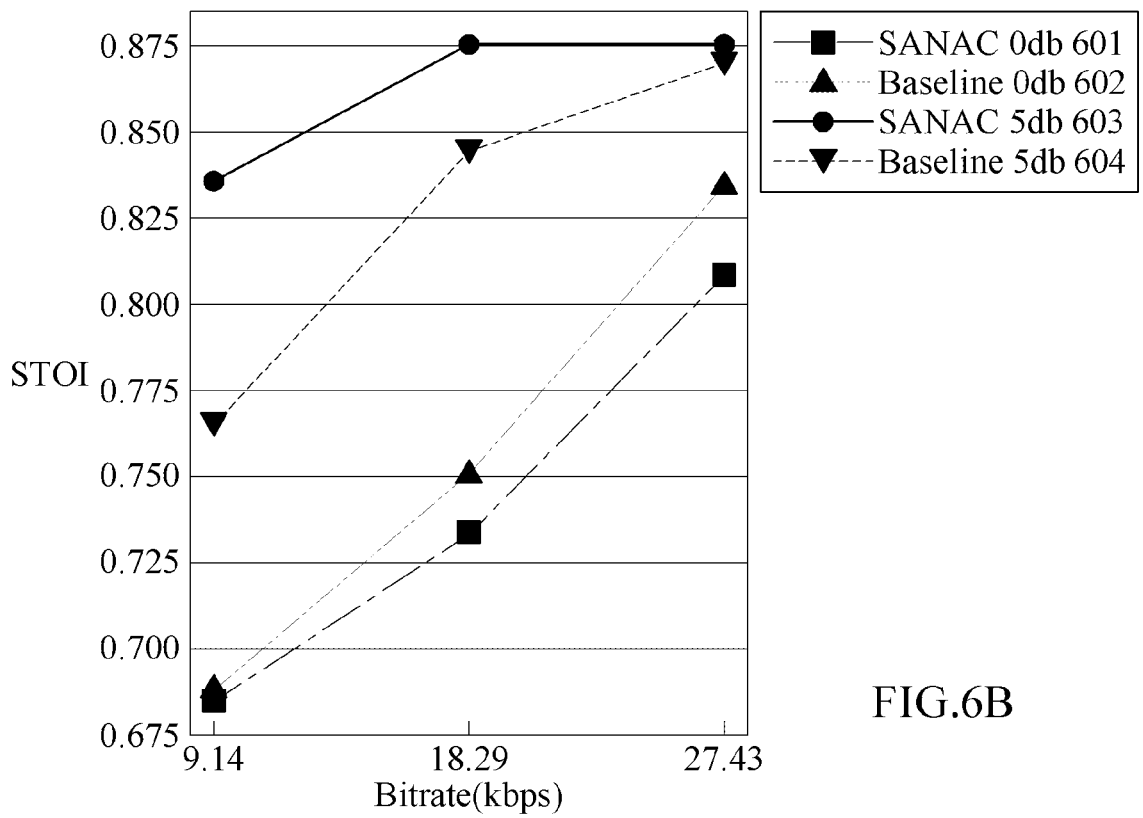
Figure 6C:
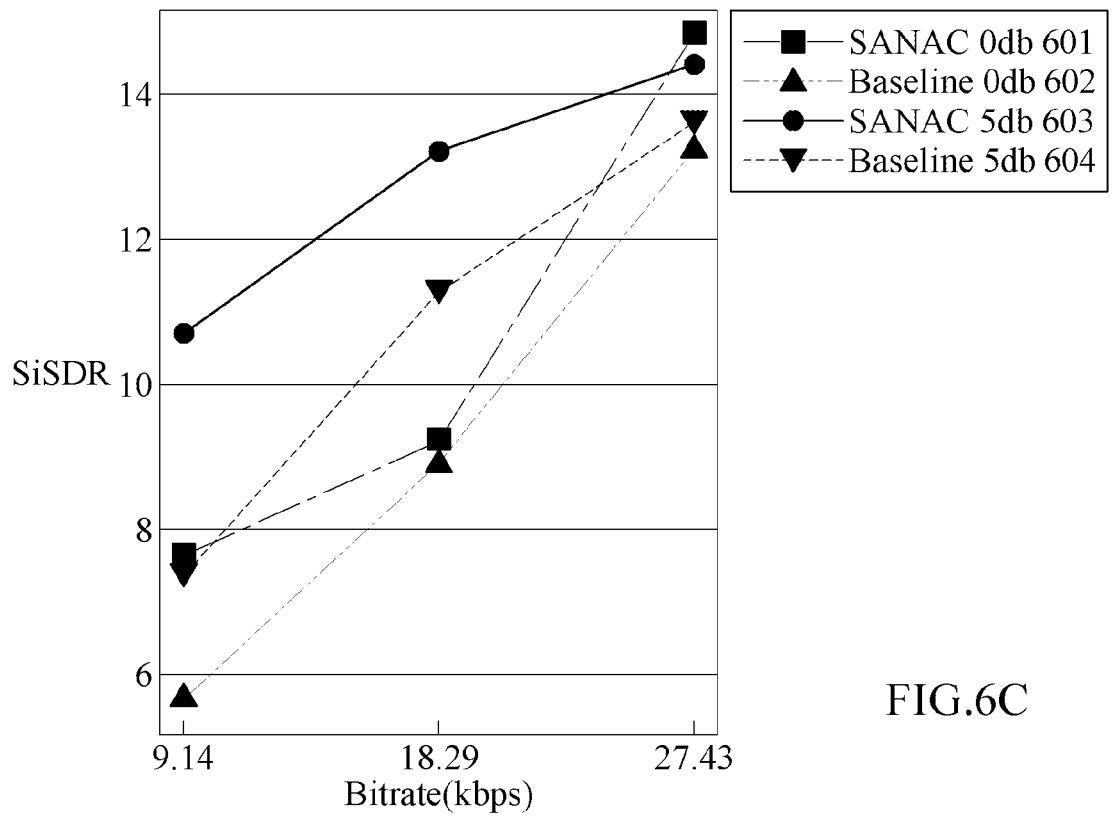
Figure 6D:
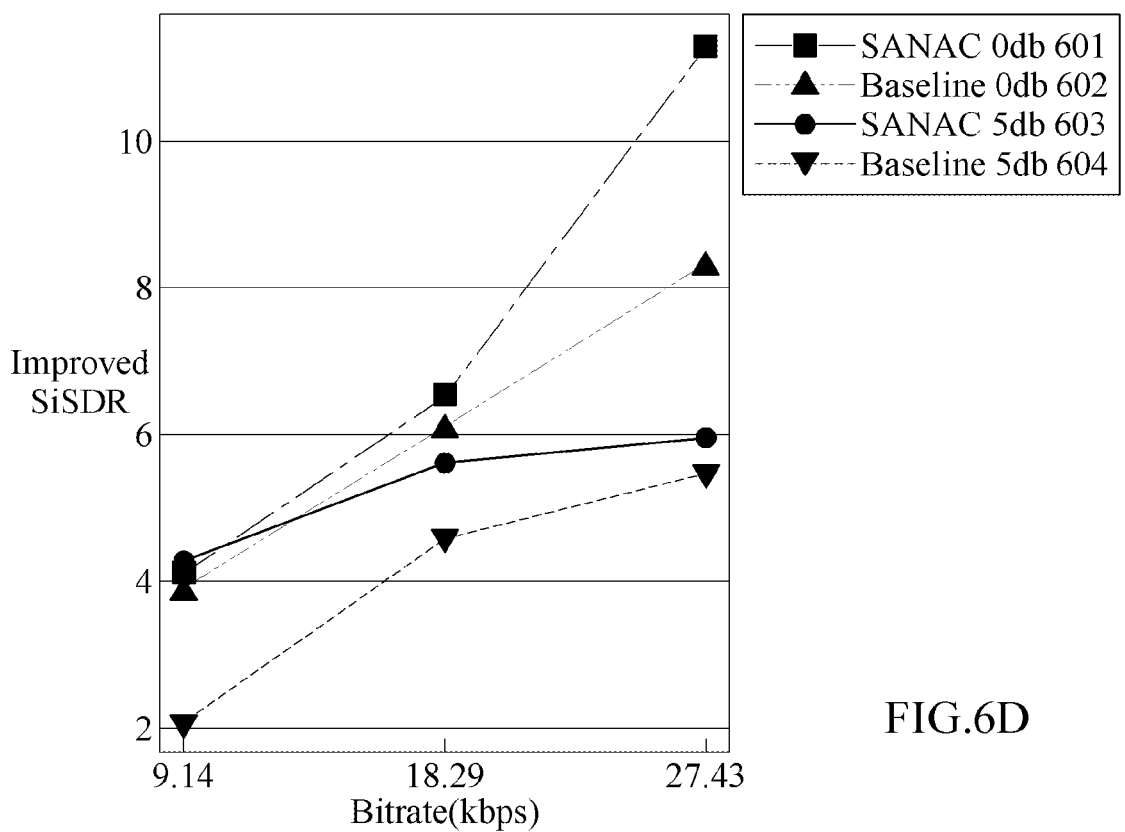

FIG. 6A shows a short-time objective intelligibility evaluation result for a speech signal mixed with noise. FIG. 6B shows a short-time objective intelligibility evaluation result for a speech signal including only speech. FIG. 6C shows a Si-SDR evaluation result for a speech signal mixed with noise. FIG. 6B shows a Si-SDR evaluation result for a speech signal including only speech.

In an example of speech, the Si-SDR is improved in 0 dB and 5 dB. For example, referring to FIG. 6A, the lower the bitrate, the more excellent performance, because a relatively high bitrate is assigned to speech. Referring to FIGS. 6A to 6D, the codecs according to an example embodiment may exhibit excellent performance in comparison to the reference codecs at a low bitrate, if noise is not significantly severe.

Figure 7A:
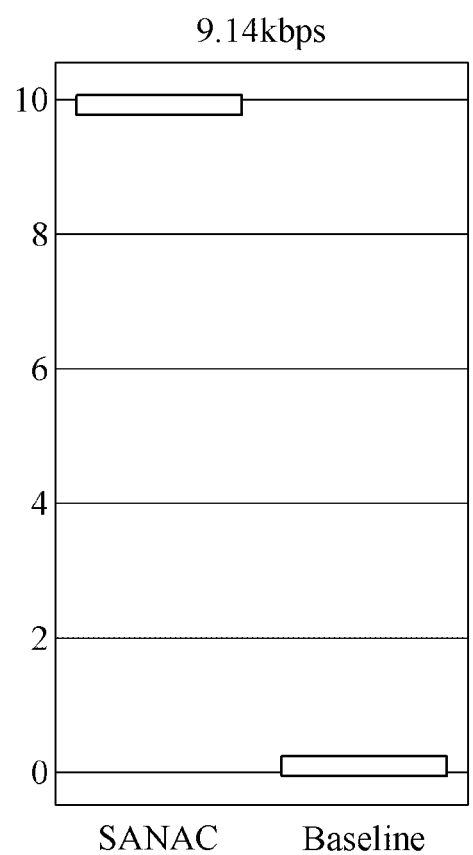
FIGS. 7A to 7C are graphs illustrating experimental results according to an example embodiment.
Figure 7B:
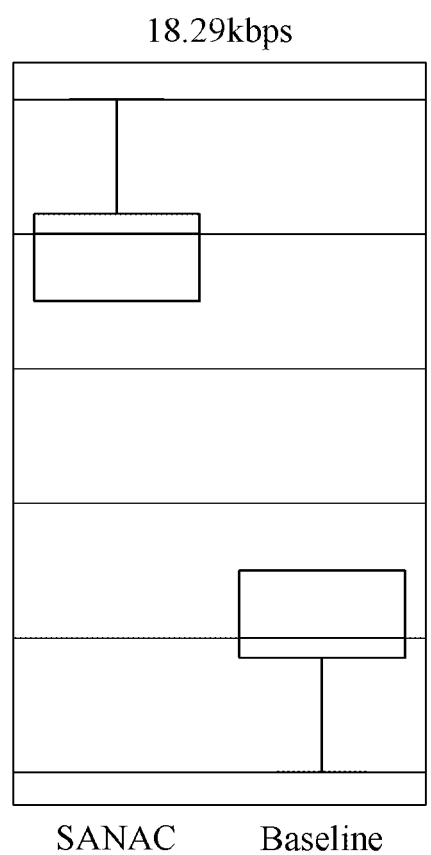
Figure 7C:
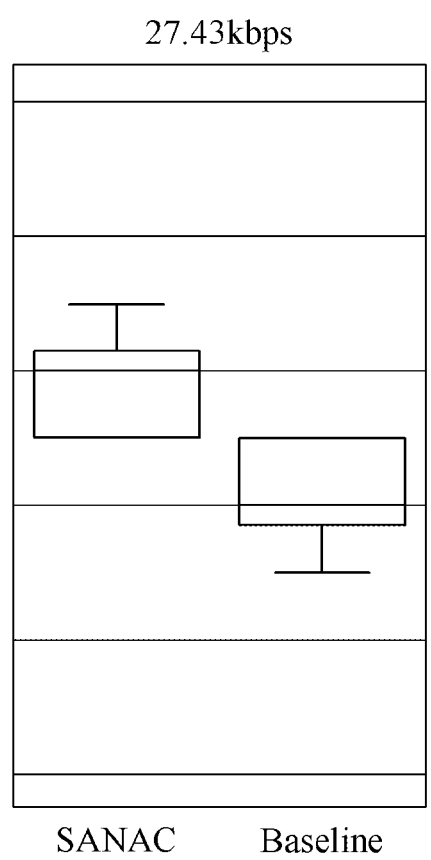

FIGS. 7A to 7C are graphs illustrating experimental results according to an example embodiment.

The graphs of FIGS. 7A to 7C show experimental results for a subjective evaluation. The graphs of FIGS. 7A to 7C may be associated with experiments conducted by eight audio experts participating in a subjective test on a perceptual quality according to an example embodiment. In FIGS. 7A to 7C, SANAC may refer to a codec according to an example embodiment, and a baseline may refer to a reference codec.

FIGS. 7A to 7C illustrate results in which the experts select a closest codec to an original speech signal from the codec according to an example embodiment and the reference codec. FIGS. 7A to 7C may be sessions conducted with different bitrates. Experiments are conducted to select a codec ten times every session. In FIGS. 7A to 7C, a vertical axis may represent a number of times a codec is selected.

Referring to FIGS. 7A to 7C, the lower the bitrate, the higher performance of the codec according to an example embodiment. However, for a high bitrate, a test result may be determined depending on a type of noise, potentially due to different denoising results.

Figure 8:
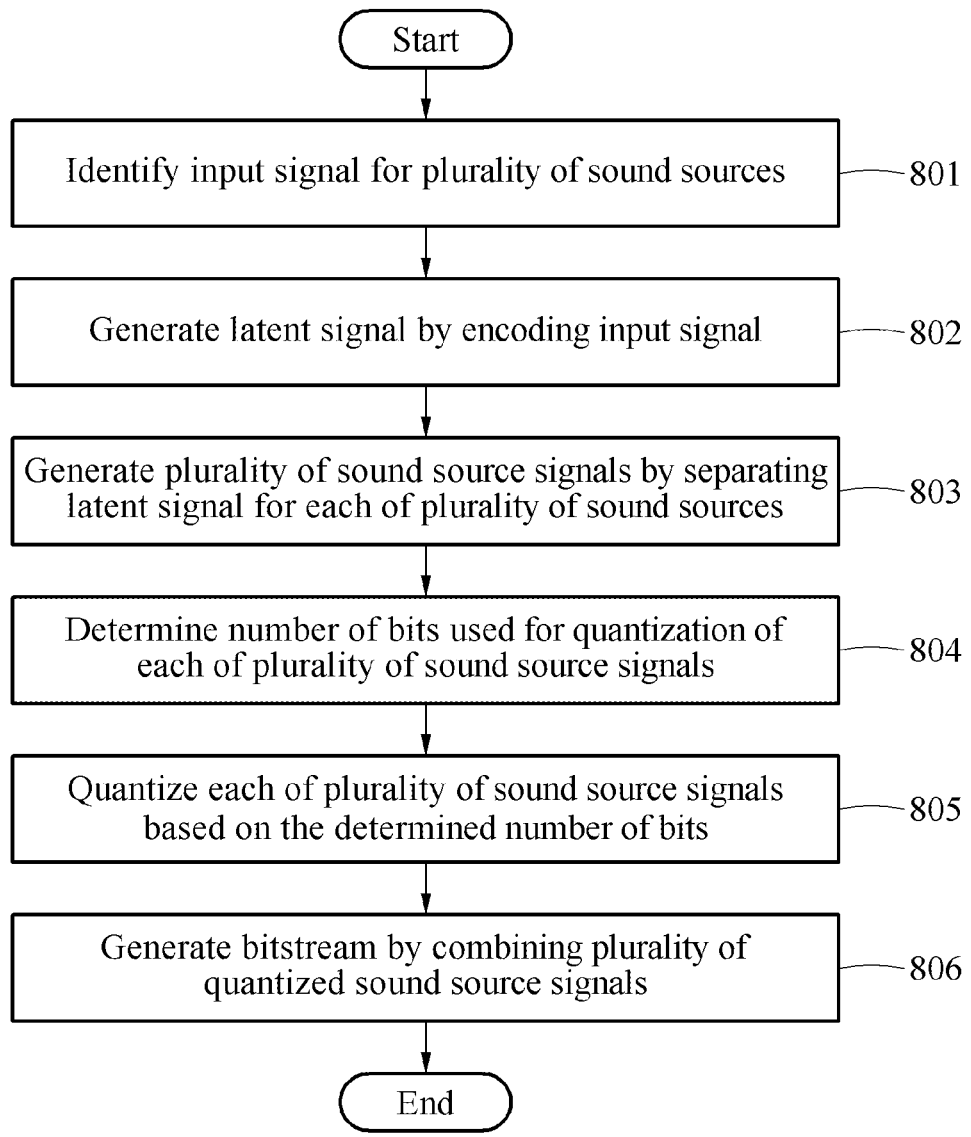
FIG. 8 is a flowchart illustrating an encoding method according to an example embodiment.

FIG. 8 is a flowchart illustrating an encoding method according to an example embodiment.

In operation 801, an encoder may identify an input signal for a plurality of sound sources. In operation 802, the encoder may generate a latent signal by encoding the input signal. In operation 803, the encoder may obtain a plurality of sound source signals by separating the latent signal for each of the plurality of sound sources.

In operation 804, the encoder may determine a number of bits used in quantization of each of the plurality of sound source signals, according to a type of each of the sound sources. In operation 805, the encoder may quantize each of the plurality of sound source signals based on the determined number of bits.

The encoder may quantize the sound source signals using vector quantization. In operation 806, the encoder may generate a bitstream by combining the plurality of quantized sound source signals.

The above-described operations may be performed by a processor of the encoder, and may be processed in an encoding model. The encoding model may generate the latent signal by encoding the input signal, may obtain the plurality of sound source signals by separating the latent signal for each of the plurality of sound sources, may determine a number of bits used for quantization of each of the plurality of sound source signals according to the type of each of the sound sources, and may quantize each of the plurality of sound source signals based on the determined number of bits.

The encoding model may generate the latent signal by extracting a feature of the input signal. In an example, a latent signal, as a compressed input signal, may refer to a latent feature vector. A sound source signal may refer to a latent signal for a specific sound source. For example, a latent signal may be separated into a sound source signal corresponding to speech and a sound source signal corresponding to noise.

Figure 9:
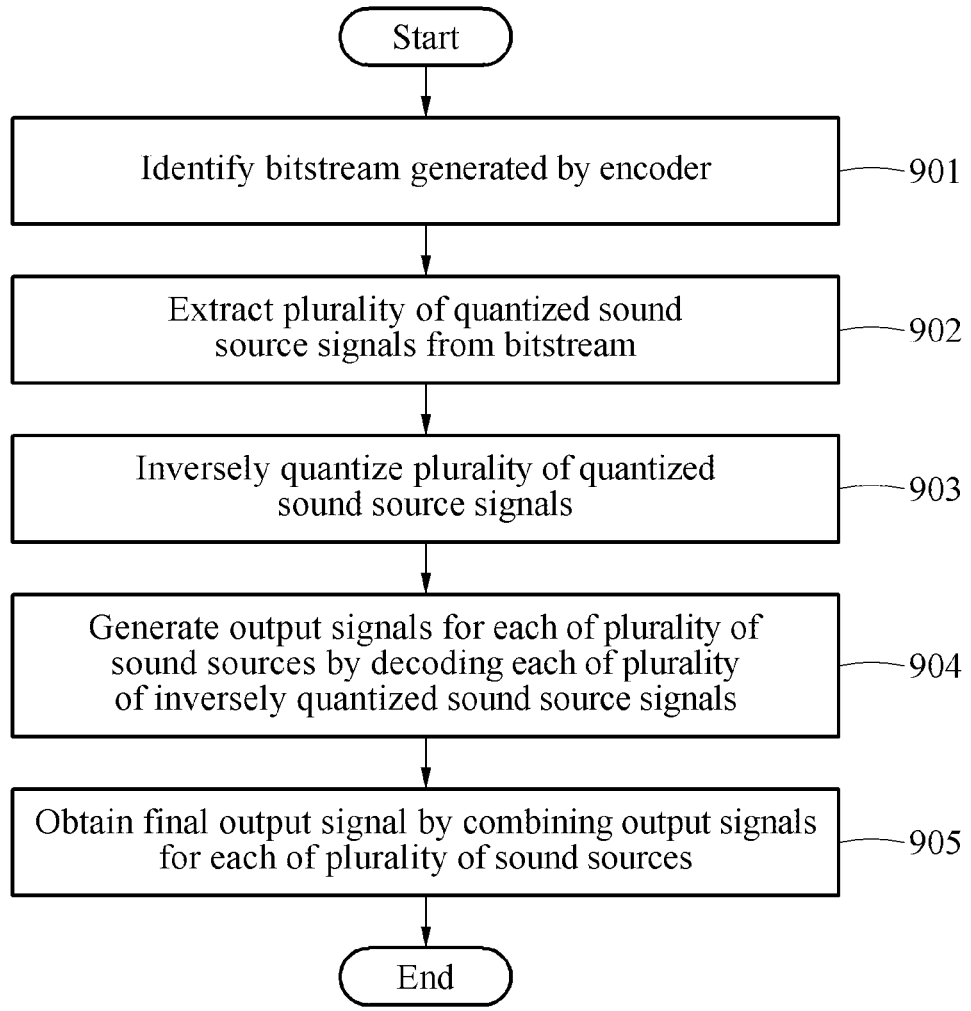
FIG. 9 is a flowchart illustrating a decoding method according to an example embodiment.

FIG. 9 is a flowchart illustrating a decoding method according to an example embodiment.

In operation 901, a decoder may identify a bitstream generated by an encoder. In operation 902, the decoder may extract sound source signals quantized for a plurality of sound sources from the bitstream.

In operation 903, the decoder may inversely quantize each of the quantized sound source signals. In operation 904, the decoder may generate output signals for each of the plurality of sound sources by decoding each of the plurality of inversely quantized sound source signals. In operation 905, the decoder may obtain a final output signal by combining the output signals for each of the plurality of sound sources.

The above-described operations may be performed by a processor of the decoder, and may be processed in a decoding model. The decoding model may be trained to extract sound source signals quantized for each of the plurality of sound sources from the bitstream and to generate the final output signal by decoding the quantized sound source signals.

The decoding model may inversely quantize each of the quantized sound source signals, may generate output signals for each of the plurality of sound sources by decoding each of the inversely quantized sound source signals, and may obtain the final output signal by combining the output sources for each of the plurality of sound sources.

The encoding model and the decoding model may be trained by the encoder or the decoder. In an example, the encoding model and the decoding model may be trained based on a difference between an input signal and an output signal reconstructed from the quantized sound source signals and a difference between entropy of the input signal and entropies of the quantized sound source signals.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to the example embodiments described above may be written in a computer-executable program and may be implemented as various recording media such as magnetic storage media, optical reading media, and digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific examples, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

Meanwhile, the example embodiments disclosed in the present specification and the drawings are intended merely to present specific examples in order to help to understand the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method of encoding a speech signal, the method comprising:
   identifying an input signal for a plurality of sound sources;
   obtaining a plurality of quantized sound source signals by inputting the input signal to an encoding model; and
   generating a bitstream by combining the plurality of quantized sound source signals,
   wherein the encoding model is trained to obtain a plurality of sound source signals by separating a latent signal of the input signal for each of the plurality of sound sources, and to quantize each of the plurality of sound source signals according to a type of each of the plurality of sound sources, and
   wherein the encoding model is trained based on a difference between the input signal and an output signal reconstructed from the quantized sound source signals and a difference between entropy of the input signal and entropies of the quantized sound source signals.

2. The method of claim 1, wherein the encoding model is configured to generate the latent signal by encoding the input signal, to obtain the plurality of sound source signals by separating the latent signal for each of the plurality of sound sources, to determine a number of bits used for quantization of each of the plurality of sound source signals according to the type of each of the plurality of sound sources, and to quantize each of the plurality of sound source signals based on the determined number of bits.

3. A method of decoding a speech signal, the method comprising:
   identifying a bitstream generated by an encoder;
   generating output signals for a plurality of sound sources by inputting the bitstream to a decoding model; and
   obtaining a final output signal by combining the output signals for the plurality of sound sources,
   wherein the decoding model is trained to extract sound source signals quantized for each of the plurality of sound sources from the bitstream and to generate the final output signal by decoding the quantized sound source signals,
   wherein the decoding model is trained based on a difference between an input signal and the final output signal and a difference between entropy of the input signal and entropies of the quantized sound source signals.

4. The method of claim 3, wherein the decoding model is configured to inversely quantize each of the quantized sound source signals, to generate output signals for each of the plurality of sound sources by decoding each of the inversely quantized sound source signals, and to obtain the final output signal by combining the output sources for each of the plurality of sound sources.

* * * * *